United States Patent [19]
Newstead et al.

[11] 3,770,083
[45] Nov. 6, 1973

[54] AUTOMATIC ADJUSTERS
[76] Inventors: Charles Newstead; Andrew Charles Walden Wright, both of Kings Rd., Tyseley, Birmingham, England
[22] Filed: Mar. 30, 1972
[21] Appl. No.: 239,561

[30] Foreign Application Priority Data
Mar. 30, 1971  Great Britain ............... 8,170/71

[52] U.S. Cl. .............. 188/79.5 GC, 188/196 F
[51] Int. Cl. ............................ F16d 65/56
[58] Field of Search ........... 188/79.5 K, 79.5 GC, 188/79.5 GT, 79.5 P, 196 F, 196 BA

[56] References Cited
UNITED STATES PATENTS
| | | | |
|---|---|---|---|
| 2,087,383 | 7/1937 | Lafitte | 188/196 F X |
| 3,103,992 | 9/1963 | Dombeck | 188/79.5 GC |
| 3,128,847 | 4/1964 | Swift | 188/79.5 GC |

Primary Examiner—Duane A. Reger
Attorney—Samuel Scrivener et al.

[57] ABSTRACT

An auto-adjuster assembly for an internal shoe drum brake comprises a uni-directional drive device the driving member of which is spring biassed in one direction and connected to a shoe movement sensor in such a manner that expansion of the shoe allows the spring to move the driving member, whereas return movement of the shoes drives the member to effect corresponding movement of the driven member to effect in turn an increment of adjustment. The members are preferably a concentric drum and inner part, interconnected by pawl means on one member and ratchet teeth on the other.

9 Claims, 7 Drawing Figures

AUTOMATIC ADJUSTERS

This invention relates to automatic adjusters for internal shoe drum brakes for vehicles, and aims at the provision of an automatic adjuster of simple construction and whose operating parts are relatively lightly loaded, compared with conventional adjusters.

In accordance with the invention there is provided an automatic adjuster assembly for internal shoe drum brakes for vehicles, said assembly comprising a uni-directional drive arrangement having a driving member and a driven member, means biassing the driving member in one direction, and sensing means for sensing movement of a brake shoe and operable in response to an actuating movement to permit the biassing means to effect a movement of the driving member in the said one direction and operable in response to return movement to effect return movement of the driving member and if the shoe movement is sufficient, a corresponding movement of the driven member, whose movement is transmitted to effect an increment of adjustment.

Movement of the driven member is preferably transmitted through a high velocity ratio transmission device which may, for example, comprise worm and wheel gearing, spur gearing or an epicyclic gear train.

This embodiment, and some modifications thereof, will now be described, by way of example only, with reference to the accompanying drawings in which.

Figure 1:
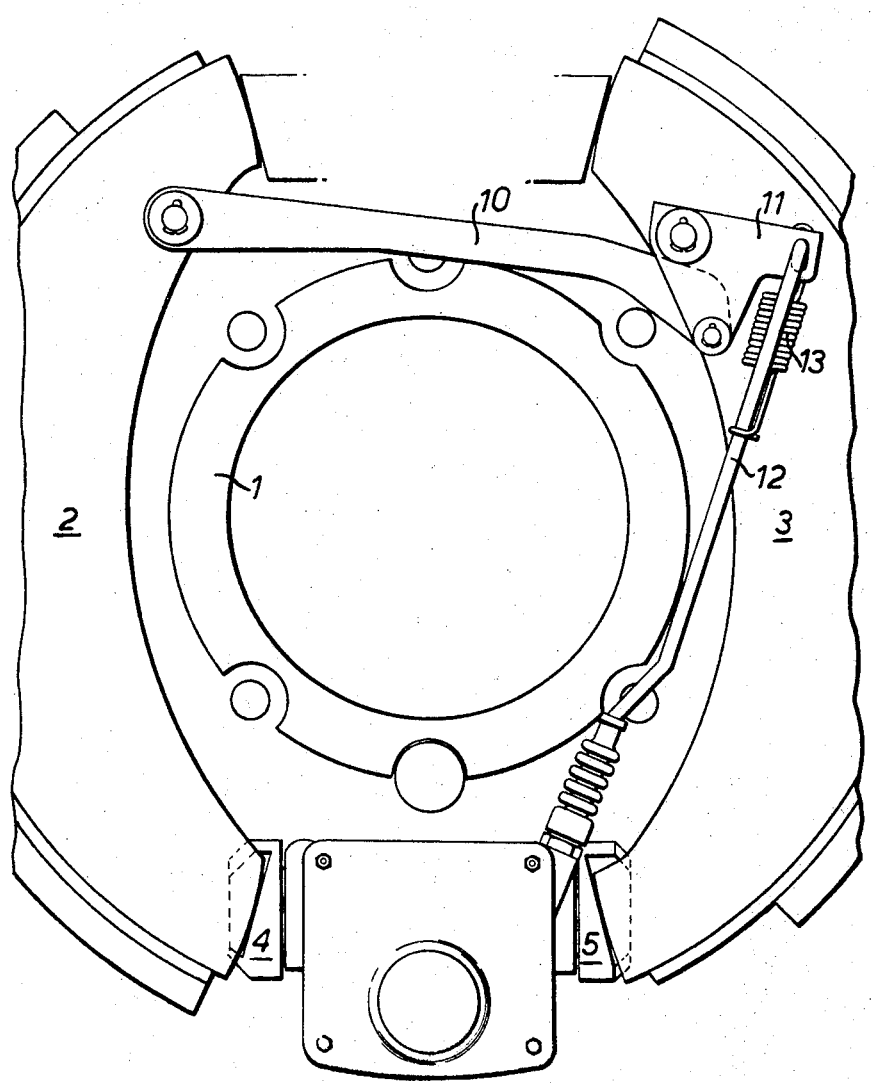
FIG. 1 is a side view of a drum brake incorporating an adjuster mechanism in accordance with the invention.

The drum brake shown in FIG. 1 comprises a backplate 1 on which are movably mounted a pair of arcuate brake shoes 2 and 3 arranged for actuation at their upper adjacent ends by an hydraulic wheel cylinder (not shown) against the action of conventional shoe return springs (not shown). At their lower ends, the shoes react against movable abutments 4 and 5 of an adjuster device, for example of the cam, or screw threaded type requiring a rotary applied movement to effect adjustment to compensate for shoe lining wear.

A detector, for sensing shoe movement, comprises a tie-bar 10 connected to one shoe 2 and at its opposite end to a bell-crank lever 11 pivoted to the other shoe 3. An adjuster rod 12 is connected at its upper end to the bell-crank lever 11 through a slotted-connection which, in conjunction with a tension spring 13, acts as an overtravel device to permit expansion and retraction of the shoes in the event of the adjuster mechanism jamming in use.

At its lower end, the adjuster rod 12 is attached to one end of a cable 14 which passes around a drum 15, through the hooked end of a band 17 wrapped around the drum 15. The other end of the band is hooked on to a pre-stressed tension spring 16 and is anchored to a stationary part of the adjuster case by a stud. The drum 15 has a toothed inner periphery, for co-operation with a pair of spring pawls 18 carried by a collar 19 in splined engagement over a shaft 20. The drum 15 and collar 19 constitute the driving and driven members of a uni-directional drive device. whose output is transmitted through a driving dog 21 on shaft 20 to a worm gear 22 co-operating with a worm wheel 23 which constitutes the final drive member for effecting adjustment of the abutments 4 and 5.

To summarize operation of the arrangement as so far described, separation of the brake shoes effects a corresponding pivotal movement of lever 11 (in a clockwise direction) and downward movement of the adjuster rod 12 to allow the cable 14 to be taken up by spring 16, thereby effecting partial rotation of the drum 15. Should shoe movement exceed a pre-determined value, this rotation of the drum 15 will enable one or other of the pawls 18 to pick up a fresh ratchet tooth, whereupon return movement of the shoes on brake release will cause the drum 15 to drive the collar 19, shaft 20, worm 22 and worm wheel 23 to effect an increment of adjustment. The drum preferably has an odd-number of ratchet teeth so that, with two diametrically opposed pawls, the number of possible incremental movements available per revolution of the drum is twice the number of ratchet teeth. Preferably, and as described, the actuating force for effecting adjustment is derived solely from the shoe return spring.

In order to permit manual resetting of the adjuster, there is provided a spindle 24 having at its exposed outer end a screw driver slot and at its inner end a driving dog 25 for engagement with the adjacent end of the worm 22. A push rod 26 passing freely through the worm spaces the spindle 24 and shaft 20 apart, so that only one or the other is engageable with the worm, and a spring 27 biases the shaft 20 into driving engagement and provides a force to close a sealing ring 28 (referred to below). A second spring 27A provides frictional restraint against undesired rotation of the collar 19.

To effect manual adjustment or resetting, the spindle 24 is pressed inwardly against the action of the spring 27, to disengage the shaft 20 from the worm and then to engage the spindle with the worm, which can then be rotated by the spindle. The automatic adjuster mechanism is thsu protected from damage by abuse of the manual resetting mechanism. The spindle 24 is provided with the dirt sealing ring 28, which in the normal inoperative position is trapped between a collar on the spindle and an adjacent cover, but is carried down into the sealed part of its housing during manual adjustment, when there is little risk of dirt or moisture entering the housing. This is preferable to sliding the spindle through the seal, which increases the risk of damage to the seal.

Figure 4:
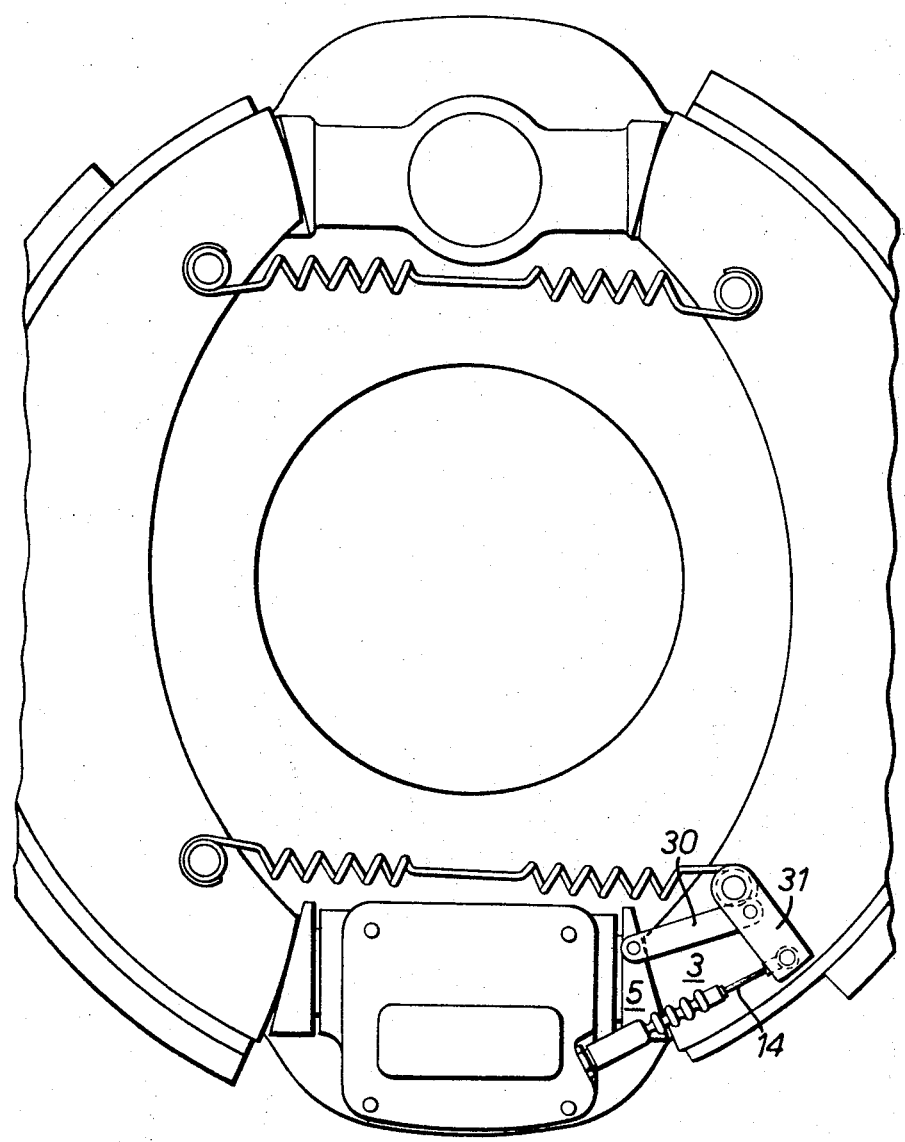
FIG. 4 is a scrap side elevation showing one modification.

FIG. 4 illustrates a modified arrangement in which the detector, instead of sensing shoe separation, senses separation of one shoe 3 from its abutment 5. A link 30 is pivoted at an end on the abutment and at its other end to an intermediate point on a lever 31, pivoted at one end on the brake shoe and having the cable 14 attached to its other end. If desired a pretensioned spring could be inserted between the lever 31 and cable 14, or a pre-compressed spring between the link 30 and lever 31 to allow for normal shoe movements in the event of the adjuster jamming.

Figure 5:
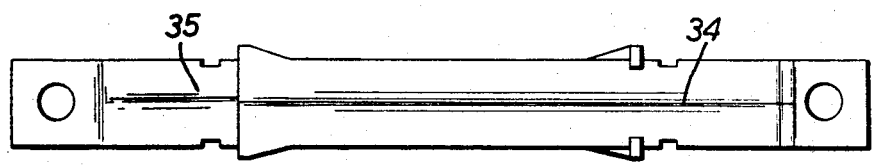
FIG. 5 is a scrap side elevation showing another modification.
Figure 6:
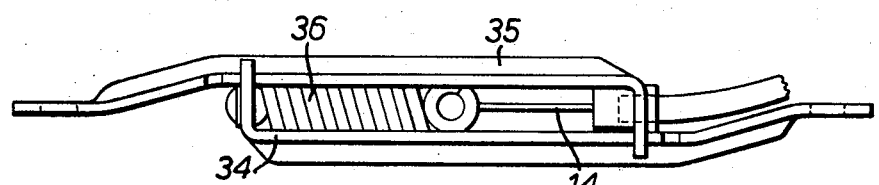
FIG. 6 is a plan view of a detail of FIG. 5.

Another form of detector is shown in FIGS. 5 and 6 and comprises a pair of telescopically assembled members 34, 35 connected at their outer ends to the respective brake shoes and at their respective inner ends to the cable and sheath of a Bowden cable. The cable 14 is coupled to the member 34 by a pre-stressed tension spring 36, to guard against jamming. As will be readily understood from FIG. 6, separation of the shoes and the consequent relative movement of the members 34 and 35 permits entry of the cable 14 further into its sheath.

Figure 2:
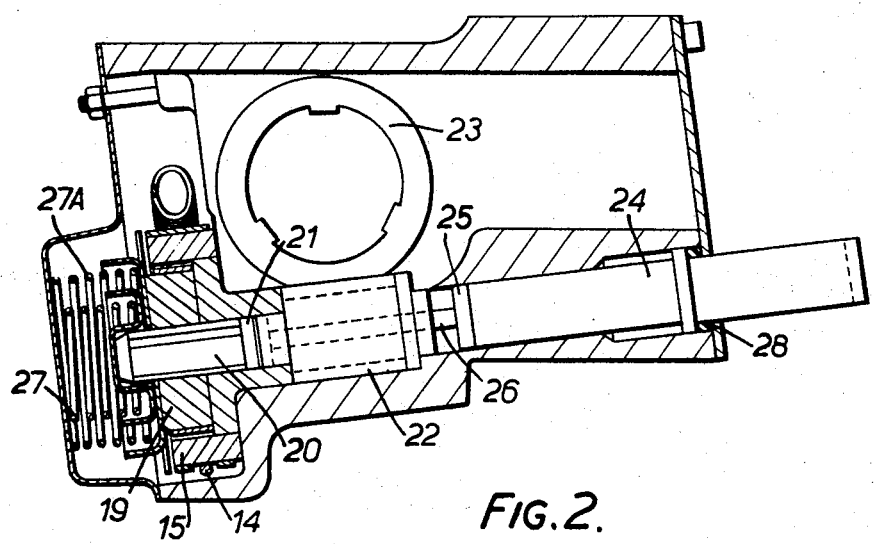
FIG. 2 is an axial section through the adjuster.
Figure 3:
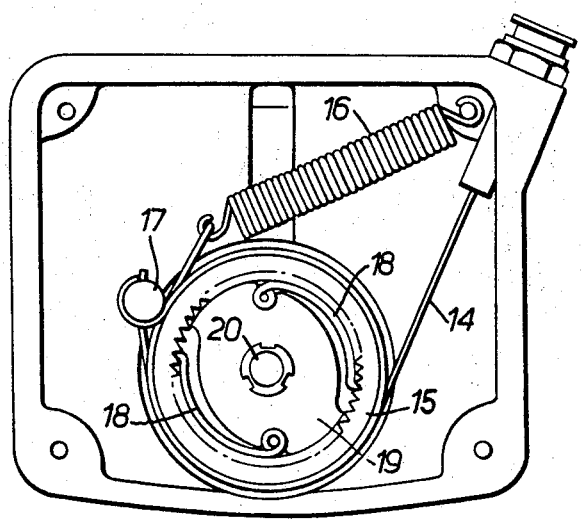
FIG. 3 is a view on the line AA of FIG. 2.
Figure 7:
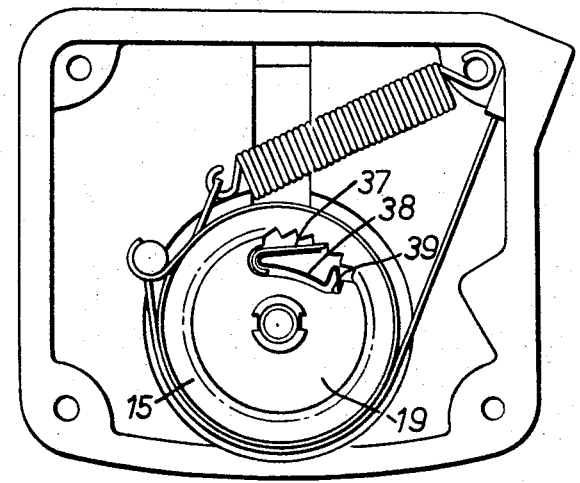
FIG. 7 is an axial section through a modified adjuster mechanism.

A modified form of adjuster mechanism is shown in FIG. 7 in which the twin pawl arrangement of FIG. 2 is replaced by a single pawl 37 biased against the ratchet teeth by a spring 38 seated within a suitably shaped recess 39 in the collar 19. Preferably, the drum 15 has twice the number of teeth as in the previously described arrangement to provide the same degree of adjustment. Further, the faces of the teeth on which the pawl normally bears are arranged to be tangential to the circle which is the locus of the tip of the pawl. This arrangement reduces backlash which may be experienced if the said faces are arranged to extend generally radially.

Many other variations and modifications will, of course, be possible within the scope of the present invention, for example, the uni-directional drive arrangement described above could employ a spring clutch or a roller clutch to provide a degree of adjustment on each brake application, instead of the finite increment provided on some brake applications by the pawl and ratchet device.

We claim:

1. In or for a vehicle drum brake having internal shoes, an automatic assembly comprising: a rotary driving member and a rotary driven member mounted concentrically with each other for rotation about a common axis; sensing means operatively connected to at least one of said brake shoes for sensing movement thereof said sensing means being operatively coupled to said driving member; biassing means coupled through said sensing means to said driving member; and uni-directional drive means acting between said driving and driven members; whereby a predetermined displacement of said one brake shoe upon brake actuation and retraction effects a reciprocatory partial rotation of said driving member, said uni-directional drive means transmitting a partial rotary movement to said driven member in one direction of rotating said driving member to effect an increment of adjustment.

2. An automatic adjuster assembly according to claim 1 wherein one of said driving member and said driven member has a peripheral surface with ratchet teeth formed thereon, and within pawl means are carried by the other of said members for engagement with said ratchet teeth, the said pawl means picking up a fresh ratchet tooth if said actuating shoe movement exceeds said predetermined amount.

3. An automatic adjuster assembly according to claim 2, wherein said pawl means comprise two diametrically opposed pawls carried by the said other member, and wherein the said one member has an odd member of ratchet teeth, whereby the number of possible incremental movements of the said driven member for each revolution of the said driving member is twice the number of ratchet teeth.

4. An automatic adjuster assembly according to claim 1, further comprising an intermediate member which is connected to said biasing means and to said sensing means and which is in engagement with said driving member, whereby the said actuating shoe movement causes said sensing means to permit a corresponding movement of said intermediate member under the biasing force of said biasing means to move said driving member.

5. An automatic adjuster assembly according to claim 1, wherein said sensing means comprise a bell crank lever having two arms and being pivotally connected intermediate said arms to one of said brake shoes, a connecting member having one end pivotally connected to one of said lever arms and the other end pivotally connected to the other of said brake shoes, and an adjuster member having one end pivotally connected to the other of said lever arms and being indirectly coupled to said biasing means, and wherein said sensing means sense separation of the said brake shoes whereby said separation causes said lever to pivot and said adjuster member to move in a direction to tend to reduce the force of said biasing means.

6. An automatic adjuster assembly according to claim 1, wherein one of said shoes cooperates with a shoe abutment and said sensing means are operable to sense the separation of the said one shoe from said abutment, said sensing means comprising a lever having one end pivotally connected to said shoe, a link member having one end pivotally connected to the said abutment and the other end pivotally connected to said lever intermediate its ends, and an adjuster member pivotally connected to the other end of said lever and indirectly coupled to said biasing means, whereby said separation of the shoe and abutment causes said lever to pivot about its said shoe connection to move said adjuster member in a direction to tend to reduce the force of said biasing means.

7. An automatic adjuster assembly according to claim 1, wherein said sensing means comprise a pair of telescopically arranged members having opposite outer ends connected to respective brake shoes and inner ends, and a cable and sheath respectively connected to the said inner ends, said cable being coupled indirectly to said biasing means and wherein said sensing means sensing separation of the said brake shoes, whereby said separation causes relative movement of said telescopically arranged members to move the said cable relatively to said sheath in a direction to tend to reduce the force of said biasing means.

8. An automatic adjuster assembly according to claim 1, further comprising a high velocity ratio device having a driving gear and a driven adjusting gear, wherein said movement of said driven member is transmitted through said device.

9. An automatic adjuster assembly according to claim 8, comprising a shaft connected to said driven member and releasably engaging said driving gear, a push rod passing through said driving gear, and a spindle axially spaced from said shaft by said push rod, wherein said spindle is manually movable axially to cause corresponding movement of said push rod and shaft to move said spindle into engagement with said shaft out of engagement with said driving gear, and said spindle is manually rotatable to rotate said driving gear to effect adjustment.

* * * * *